United States Patent [19]
Coffin et al.

[11] Patent Number: 5,428,809
[45] Date of Patent: Jun. 27, 1995

[54] HIGH SPEED PARALLEL MICROCODE PROGRAM CONTROLLER WITH HIGH EFFICIENCY INSTRUCTION SET FOR ASIC

[75] Inventors: John M. Coffin, Gardena; John J. Seibold, Redondo Beach, both of Calif.

[73] Assignee: Hughes Aircraft Company, Los Angeles, Calif.

[21] Appl. No.: 220,403

[22] Filed: Mar. 29, 1994

Related U.S. Application Data

[63] Continuation of Ser. No. 734,343, Jul. 9, 1991, abandoned.

[51] Int. Cl.$^6$ .............................................. G06F 9/32
[52] U.S. Cl. ................................... 395/800; 395/375; 364/DIG. 1; 364/247
[58] Field of Search ............. 395/800, 375, 725, 775

[56] References Cited

U.S. PATENT DOCUMENTS

| | | | |
|---|---|---|---|
| 4,003,033 | 1/1977 | O'Keefe et al. | 395/725 |
| 4,179,737 | 12/1979 | Kim | 395/375 |
| 4,546,431 | 10/1985 | Horvath | 395/375 |
| 4,719,565 | 1/1988 | Mollar | 395/725 |
| 4,881,194 | 11/1989 | Sprague et al. | 395/375 |
| 4,920,482 | 4/1990 | Hasebe et al. | 395/375 |
| 4,984,151 | 1/1991 | Dufari | 395/775 |

FOREIGN PATENT DOCUMENTS 0522513 7/1992 European Pat. Off. .

Primary Examiner—Alyssa H. Bowler
Assistant Examiner—Mehmet Geckil
Attorney, Agent, or Firm—Leonard A. Alkov; W. K. Denson-Low

[57] ABSTRACT

A microprogram controller selects a sequence of low, gate level instructions (microcode) to execute a higher level (assembly language level) instruction. The controller includes a plurality of accessing elements for accessing a microinstruction from a corresponding plurality of different possible blocks of a microprogram store. All accessing elements are executed in parallel to provide a plurality of possible microinstructions. Control logic selects which one of the three accessed microinstructions is to be used next in sequence. The parallel nature of this process is fast. A unique instruction set minimizes the number of gates required for microcode storage. A subset of these instructions increase the efficiency of the microcode in terms of both the number of microinstructions required to perform a function and the microcode store address space-consumed by those microinstructions.

8 Claims, 3 Drawing Sheets

NOTE 1: THE PBCT ADDRESS CAUSES THE BRANCH ADDRESS TO BE PUSHED ON TO THE STACK. ALL OTHER INSTRUCTIONS WHICH PUSH VALUES ON THE STACK PUSH THE μPC ADDRESS.

NOTE 2: THE CLLC INSTRUCTION CONDITIONALLY LOADS THE LPC. IF ES=L, LPC IS LOADED FROM BRANCH FIELD; OTHERWISE THE LPC IS HELD.

| I3-I6 | MNE-MONIC | NAME | LPC CON-TENTS | FAIL (ES=H) | | | | PASS (ES=L) | | | |
|---|---|---|---|---|---|---|---|---|---|---|---|
| | | | | μCODE | STACK | LdμPC | μCODE | STACK | LdμPC | LPC |
| 0 | CONT | CONTINUE | X | μPC | HOLD | μPC+1 | μPC | HOLD | μPC+1 | HOLD |
| 1 | CBR | COND BR | X | μPC | HOLD | μPC+1 | BR | HOLD | BR+1 | HOLD |
| 2 | PBCT | PUSH BR & CONT | X | μPC | NOTE1 | μPC+1 | BR | NOTE1 | μPC+1 | HOLD |
| 3 | CBRP | COND BR & POP | X | μPC | HOLD | μPC+1 | BR | POP | BR+1 | HOLD |
| 4 | PCT | PUSH & CONT | X | μPC | PUSH | μPC+1 | μPC | PUSH | μPC+1 | HOLD |
| 5 | CPB | COND PUSH & BR (CALL SUB) | X | μPC | HOLD | μPC+1 | BR | PUSH | BR+1 | HOLD |
| 6 | BELP | BR IF LPC ≠ 0 | ≠0 | BR | HOLD | BR+1 | BR | HOLD | BR+1 | DCR |
| 6 | BELP | BR IF LPC ≠ 0 | =0 | μPC | HOLD | μPC+1 | μPC | HOLD | μPC+1 | HOLD |
| 7 | BRTP | BR OR RTN & POP | X | BR | HOLD | BR+1 | RTN | POP | RTN+1 | HOLD |
| 8 | LLCT | LOAD LPC & CONT | X | μPC | HOLD | μPC+1 | μPC | HOLD | μPC+1 | Ld FROM PLR |
| 9 | LLCB | LOAD LPC & COND BR | X | μPC | HOLD | μPC+1 | BR | HOLD | BR+1 | Ld FROM DOS |
| 10 | CLLC | COND LOAD LPC & CONT | X | μPC | HOLD | μPC+1 | μPC | HOLD | μPC+1 | NOTE 2 |
| 11 | LLVB | Ld LPC VECT BITS & COND BR | X | μPC | HOLD | μPC+1 | BR | HOLD | BR+1 | Ld 3:0 FROM DOB |
| 12 | LULBC | μPC ← BR & CONT | X | μPC | HOLD | μPC+1 | BR | HOLD | BR | HOLD |
| 13 | LULB | μPC ← LPC & COND BR | X | μPC | HOLD | μPC+1 | BR | HOLD | LPC | HOLD |
| 14 | LLRC | μPC ← RTN & CONT & COND POP | X | μPC | HOLD | μPC+1 | μPC | POP | RTN | HOLD |
| 15 | BRTN | BR OR RTN (NO POP) | X | BR | HOLD | BR+1 | RTN | HOLD | RTN+1 | HOLD |

FIG.3

HIGH SPEED PARALLEL MICROCODE PROGRAM CONTROLLER WITH HIGH EFFICIENCY INSTRUCTION SET FOR ASIC

This is a continuation of application Ser. No. 07/734,343, filed Jul. 9, 1991, now abandoned.

BACKGROUND OF THE INVENTION

The present invention relates to microprogram controllers, and more particularly to a high speed controller which performs certain operations in parallel with other operations.

All microprogram controllers control the sequence of one microinstruction to the next. A microinstruction is a gate level instruction residing in microprogram store which controls "AND" gates, "OR" gates, memory elements, etc., in a manner required to execute a portion of a higher level (assembly language) instruction. Some of the gates that are controlled make up the microprogram controller itself. Therefore, each microinstruction accessed by the controller has embedded within it a "microprogram controller instruction" field for the microprogram controller telling it how to fetch the next microinstruction. A set of microinstructions may be required to execute one higher level instruction.

Microprogram controllers generally provide three basic methods of accessing the next microinstruction. The next microinstruction may be:

1. "continued to"—accessed from the next sequential address in microprogram store;
2. "branched to"—accessed from an address supplied by the current microinstruction;
3. "returned to"—accessed from an address supplied by a stack.

Usually microprogram controllers are built such that a decision of which of the three methods is used can be based on an external status input. For example, the microprogram controller may perform a "branch" if the status input indicates a pass condition, or a "continue" if the input indicates a fail condition.

Conventional "serial process" microprogram controllers must first choose which of the three methods will be used to access the next microinstruction. The microprogram controller then provides the selected address (continue, branch, or return) to the microcode store to access the next microinstruction. A disadvantage of such controllers is the serial nature (and its slower speed) of the process used to generate the next gate level instruction or microword.

SUMMARY OF THE INVENTION

A microprogram controller is disclosed for controlling the sequence of one microinstruction to the next. The controller comprises accessing elements for accessing a microinstruction from the next sequential address in microprogram store, for accessing a microinstruction from an address supplied by the current microinstruction, and for accessing a microinstruction from an address supplied by a stack. The controller is further characterized in that all accessing elements are performed in parallel to provide three possible microinstructions. Control logic selects which one of the three accessed microinstructions is to be used next in sequence.

In an exemplary embodiment, the microprogram store is characterized by first, second and third blocks of microcode store. The first block is devoted to microcode that will be accessed from the next sequential address, i.e., "continued to." The second block is devoted to microcode that will be accessed from an address supplied by the current microinstruction, i.e., "branched to." The third microprogram store is devoted to microcode that will be accessed from an address supplied by a stack, i.e., "returned to."

BRIEF DESCRIPTION OF THE DRAWING

These and other features and advantages of the present invention will become more apparent from the following detailed description of an exemplary embodiment thereof, as illustrated-in the accompanying drawings, in which:

FIG. 3 illustrates the various instructions which may be executed by the controller of FIG. 1.

DETAILED DESCRIPTION OF THE PREFERRED EMBODIMENT

Figure 1:
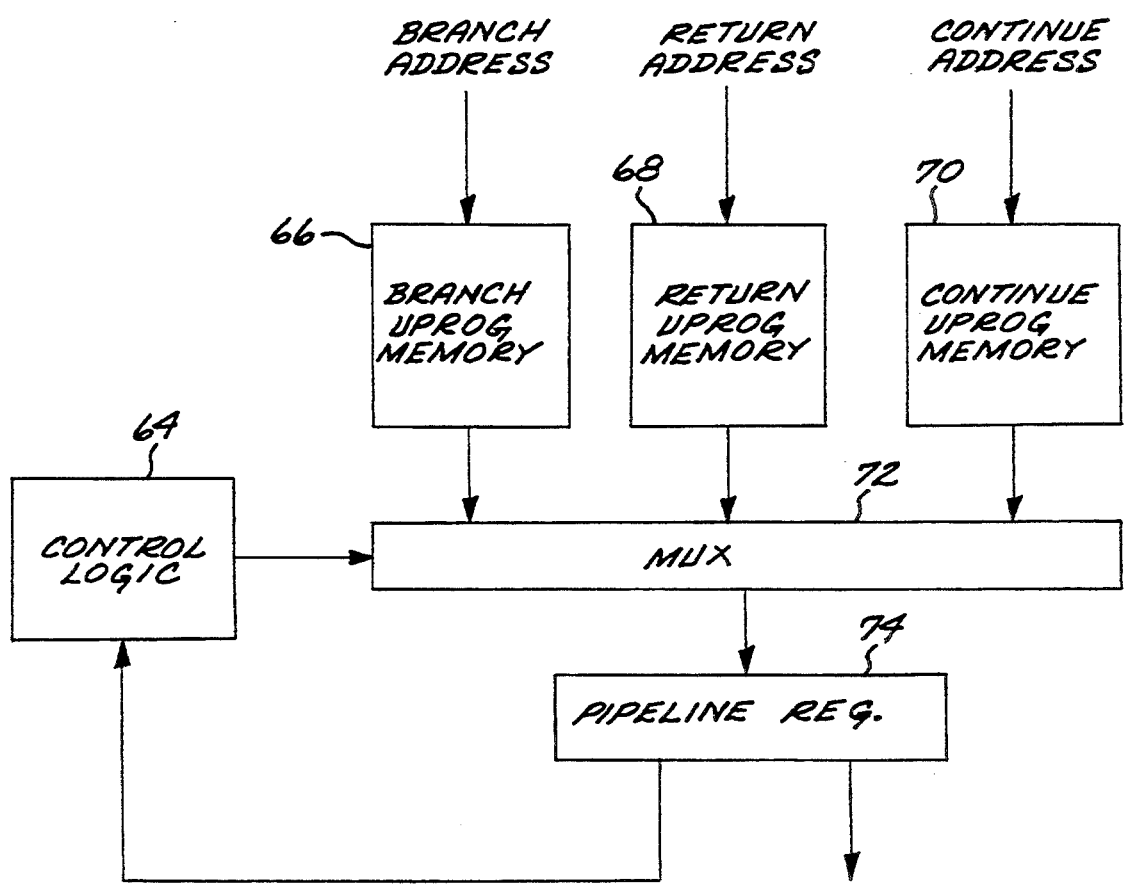
FIG. 1 is a simplified schematic block diagram illustrating the invention.

A controller embodying the invention provides the same three basic methods of accessing the next instruction as in conventional controllers, i.e., "branch," "continue" and "return." In accordance with the invention, however, the serial select and access steps are converted into parallel processes. This is done by performing all three methods of accessing the next microinstruction in parallel. The decision to choose which one of the three accessed microinstructions is to be used is done in parallel by other logic. This is illustrated in the simplified schematic block diagram of FIG. 1.

To allow parallel accessing of the three microinstructions, three blocks 66, 68, 70 of microcode store are created. One block 70 is devoted to microcode that will be "continued to." Another block 66 is devoted to microcode that will be "branched to." The third block 68 is devoted to microcode that will be "returned to." All three blocks use the same address space. However, if a particular address is never accessed by one or more of the three methods, the microcode is not included in the respective blocks. For example, a particular microinstruction may only be "continued to." Therefore, it will not be included in the branch or return blocks. In this way unnecessary duplication of microcode across the blocks is avoided, which will typically save thousands of gates if the controller is implemented in an ASIC ("Application Specific Integrated Circuit").

The respective addresses for the branch, return and continue microcode blocks 66, 68 and 70 are supplied in parallel. The selected microinstructions are fed to a multiplexer 72, controlled by the control logic 64 to select the appropriate microinstruction addressed by the three addresses provided in parallel. The multiplexer output is fed to a pipeline register 74.

Figure 2:
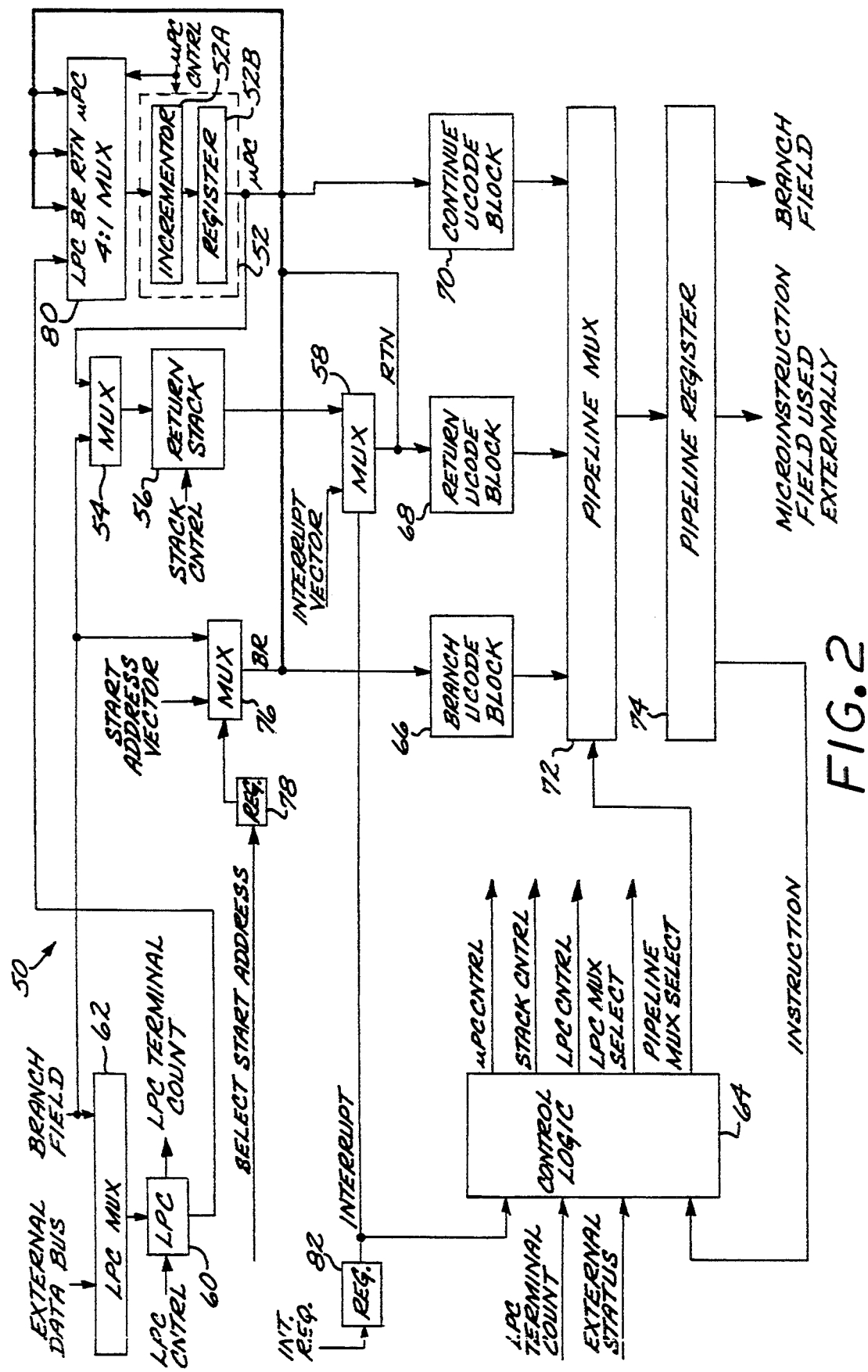
FIG. 2 is a block diagram of an exemplary microcode program controller embodying the invention.

A microcode program controller 50 in accordance with the invention is illustrated in block diagram form in FIG. 2. Typically the microcode program controller will be used as part of a computer's CPU or in other systems which require complex digital control logic.

Each of the three blocks 66, 68 and 70 of microcode have direct address sources such that they never have to wait for an address to be selected based on the status input.

The "continue" block 70 address is sourced from the microprogram counter 52.

The "branch" block 66 address is sourced by either the branch field of the microinstruction or from an external start address vector. The multiplexer 76 choosing these two sources is controlled directly from a register 78.

The "return" block address is sourced by either the microprogram stack 56 or an interrupt vector. The multiplexer 58 choosing these two sources is controlled directly from a register 82. Register 82 is driven by the signal INT REQ; the register output is the signal "Interrupt Request." If the latter signal is active, the interrupt will always occur regardless of other current activity in the multiplexer 80. The controller 50 will immediately stop what it is doing and branch to an interrupt service routine. The particular routine to be executed will depend on the interrupt vector which is one of the inputs to multiplexer 58. This interrupt mechanism is usually used for emergency situations when an abnormal condition occurs in the external system.

As is well known in the art, a "stack" is a multilocation register file. It works like a stack of plates at a salad bar, for example. The last plate placed on top of the stack, i.e., the last plate "pushed," is the first plate to be removed, i.e., "popped." Rather than storing plates, the stack 56 is used to store microprogram addresses for use at a later time. For example, if the microcode is about to jump to a subroutine at the different address location, an address known as the "Return Address" is stored in the stack 56 to be used when the subroutine is finished executing. The Return Address is used to return from the subroutine back to the area of microcode where the jump took place.

The branch and return UCODE blocks 66 and 68 can each be addressed by two sources which are selected by the multiplexers 76 and 58 respectively. In the disclosed embodiment, the selection of one of the two sources is controlled by registers 78 and 82. Use of these registered "select controls" avoids unnecessary propagation delays. In an alternative embodiment, the address sources could be separated by adding two additional UCODE blocks. One, the Interrupt UCODE block, would be addressed by the Interrupt Vector. The other, the Start UCODE Block, would be addressed by the Start Address Vector. This alternative implementation would potentially allow interrupts and start addresses to be processed in fewer number of clock cycles but would be less efficient in terms of gates.

Typically, microprogram controllers are used to translate assembly level instructions into the sequence of events (i.e., the microprogram) required to perform that instruction. Assembly level instructions contain an "op code" which is translated into a microprogram start address. In the controller 50, this translation is performed externally and input via the Start Address Vector bus of the Branch multiplexer 76. An alternate (and probably more typical) method of performing this translation would be to add the additional block of microprogram store mentioned above called the Start UCODE Bloc. This added block would contain only the first microinstruction of each microprogram. This alternative method allows assembly level instructions to be interpreted in fewer clock cycles but is less efficient "gatewise."

The microprogram controller 50 in this exemplary embodiment is controlled by sixteen (16) different instructions involving continue, branch, and return. Some of the instructions are used for stack maintenance (push, pop) and some for loading an internal loop counter 60.

The loop counter 60, as its name implies, is normally used to count loops within the microcode. It can be loaded either directly from the microinstruction via the branch address or from an external source. Loading the loop counter involves decoding the four bit instruction field from the pipeline register 74 using the control logic 64. The control logic 64 will generate a signal to select either the external data bus input or the Branch field input. Simultaneously, another signal is generated by the control logic to load the selection into the loop counter 60. This external source allows either values embedded within the assembly language instructions or data dependent values to be loaded into the loop counter 60. These values can be used in the typical fashion, to control microcode looping, or they can be passed to the microprogram counter 52 to be used as address vectors. This second usage allows multi-way microcode branches to be performed. Typical two-way branching involves selecting the microinstruction at either the next sequential address or at the branch address. This selection is based on the external status input or loop counter.

Multi-way branching involves forming the address for the next micro-instruction in the loop counter 60 using a value from the External Data Bus (EDB). This allows branching to one of multiple addresses based on the value of the EDB. A multiplexer 62 selects the counter value to be loaded into the loop counter 60, from either the external data bus or the "branch field." The branch field is part of the micro-word from the pipeline register 74. The field is usually used as an address vector which will either be stored in the stack 56 for later use or used immediately by the branch UCODE block 66 to jump to a different location in the address space. When the branch field is not needed as an address vector it can be used to represent a value to be loaded into the loop counter 60. The value would represent the number of times a microcode loop is to be repeated.

Element 80 is a 4-to-1 multiplexer with inputs LPC (loop counter), BR (the address to the branch block), RTN (the address to the return block), and uPC (micro program counter). The selected input is fed to the microprogram counter 52, which comprises an incrementor element 52A and register 52B. The incrementor 52A conditionally adds one to its input. The function of the micro program counter 52 is to form an address for the next sequential microcode word (the next word to be continued to). Counter 52 is similar to a counter except counters do not have the ability to "add 1" to an input as it is being loaded. For example, if a word from the Branch microcode block is addressed and loaded into the pipeline register for execution, the branch address will be incremented (+1) and loaded into element 52B. This incremented address will then be used as the address for the "Continue Microcode Block."

The micro program counter 52 is controlled by the set of signals uPC CNTL from element 64, one of which determines if the input selected by the multiplexer 80 is to be incremented or not by the incrementor 52A before being loaded into the register 52B. The remaining signals which make up uPC CNTL are used to control the multiplexer 80 that selects the input to the incrementor.

The incrementor 52A is purely combinational logic, and contains no storage elements. All sequences are started using either a Start Address Vector or an Interrupt Vector. Therefore element 52B will be loaded with either the "Start Address Vector+1" or the "interrupt Vector+1" before its contents are ever used to access a microinstruction which is loaded into the Pipeline Register 74.

Under control of the control logic 64 (discussed below) the microprogram counter 52 will either count up or be loaded with an address from one of three sources—the branch block address, the return block address or the loop counter. The branch block and return block addresses may or may not be incremented prior to being loaded in the microprogram counter 52, again under control of the control logic 64. The control logic 64 controls the microprogram counter 52 by decoding its inputs as described in FIG. 2. The column labeled "Ld uPC" shows how the values loaded into the counter vary according to the state of the inputs to the control logic 64. FIG. 2 illustrates that the decision of whether or not to increment the incoming address depends only on the instruction from the pipeline register (column labeled "$I_3$–$I_0$"). Also the selection of which of the four inputs to element 80 will be selected depends on the External Status (ES) signal as well as the instruction from the pipeline register 74.

The stack 56 is a two word stack, but it can easily be extended. Addresses may be pushed on to the stack 56 from either the microprogram counter 52 or from the branch field of the microinstruction.

Element 54 is a 2:1 multiplexer which selects the source of the address to be "pushed" on to the return stack 56. This multiplexer 54 is controlled by the control logic 64. When the control logic instruction is PBCT (Push Branch and Continue) the multiplexer selects the Branch address to be pushed. Otherwise, the multiplexer selects the uPC address to be pushed.

The last major block is the control logic 64. The control logic 64 uses a four-bit instruction field from the microinstruction, the conditional status input (EXTERNAL STATUS) and the loop counter (LPC) terminal count to generate required control signals in the controller 50. The signals "PIPELINE MUX SELECT" from the control logic 64 select which of the three microcode blocks will be used to source the next micro word. The remaining control logic outputs LPC CNTRL, uPC and STACK CONTROL control the operation of the loop counter, the microprogram counter and the stack.

FIG. 3 is a table of the sixteen instructions the decoder logic 64 performs and also the effect of the conditional status input and the loop counter terminal count. In FIG. 2 "uPC" refers to the microprogram counter 52; in the column labeled "uCode," "uPC" implies "continue" block 70 of microcode. "BR" refers to Branch Address; in the column labeled "uCode," BR implies the "branch" block 66 of microcode. "RTN" refers to Return Address; in the column labeled "uCode," RTN implies the "return" block 68 of microcode. "LPC" refers to the loop counter 60. "ES" refers to External Status.

Seven of the sixteen instructions are similar to instructions used by conventional microcontrollers, i.e., the CONT, CBR, CBRP, PCT, CPB, BRLP and LLCT instructions. The nine remaining instructions are unique to the controller 52. The PBCT, BRTP, LLCB, LLVB, and BRTN instructions perform functions which are very useful in reducing the execution time and the amount of microcode store address space to perform a function. The LUBC and LURC instructions perform functions which are useful in reducing the number of duplicate microinstructions across the three blocks of microcode (and therefore the number of gates required to implement these blocks.)

It should be noted that the usefulness of many of the instructions is greatly enhanced if the microcode has the ability to directly control the state of the external status signal. This allows the microcode to force either a "pass" or "fail" condition when the external status signal is not being used to test the status of an external signal. Use of the external status signal in this manner effectively adds an additional bit to the instruction field by allowing the microcode to unconditionally choose the "pass" or "fail" function performed by the instruction. A bit (not shown in FIG. 2) from the pipeline register 74 can be used to force the External Status (ES) signal to 1 or 0. In another embodiment, this external logic could readily be incorporated into the logic of FIG. 2.

It should also be noted that for all instructions where the branch field is used, if the branch field is set to a value equal to the microprogram counter, the effect would be a "continue" type operation. In this way, for example, an instruction such as CBRP could be made to do a "continue and pop" rather than a "conditional branch and pop."

The individual instructions are now discussed.

CONT: Continue. The continue instruction simply causes execution of the next sequential microinstruction. It is independent of the condition code input. It uses the "continue block" of microcode. The microprogram counter 52 is incremented.

CBR: Conditional Branch. This instruction allows one of two microinstructions to be executed based on some external condition. If the condition passes, the next microinstruction performed will be from the "branch block" and the microprogram counter will be updated with the branch address plus one. If the condition fails, the next microinstruction performed will be from the "continue block" and the microprogram counter 52 will be incremented.

PBCT: Push branch and continue. This instruction causes the current value of the microinstruction branch field to be pushed on to the stack 56. It is independent of the External Status (ES) input. It always uses the "continue block" as the source of the next microinstruction and it always increments the microprogram counter 52. This instruction allows the flexibility to return from a subroutine to any microinstruction address rather than simply the standard approach of returning to the next sequential address from where the subroutine was called. To perform such a subroutine call the PBCT would be executed prior to an instruction (such as CBR) which allows a conditional jump to the subroutine but which does not push an address on to the stack. This is very useful because it is most often the case that the microinstructions sequentially following a conditional subroutine call should not or need not be executed. PBCT is also useful outside of subroutines in that it can setup an address for a subsequent BRTP or BRTN instruction and thus allow two way branches with no restriction on the address in either leg of the branch.

CBRP: Conditional branch and pop. This instruction is very similar to the conditional branch (CBR) instruction. But in addition to the CBR functions, if the condition passes, it also pops the stack 56. This is usually done after exiting a "repeat until" type loop (using the BRTN instruction) after which the word on the stack 56 is no longer needed.

PCT: Push and continue. The action of this instruction is independent of the condition input. It causes the current value of the microprogram counter to be pushed onto the stack 56 while continuing to the next microinstruction. This instruction is used to set up a "repeat until" type loop.

CPB: Conditional push and branch. This instruction is used for conditionally calling a subroutine. If the condition passes, the current value of the microprogram counter is pushed onto the stack and the branch field is used to jump to the subroutine. In this case the "Branch" block is used and the microprogram counter 52 will be updated with the branch address plus one. When the subroutine is complete, a return and pop instruction is typically done (BRTP). If the condition fails, the next microinstruction performed will be from the "continue block" and the microprogram counter 52 will be incremented.

BRLP: Branch if loop counter 60 not equal to zero. This instruction is used to execute a sequence of microinstructions a number of times based on the contents of the loop counter 60. The counter 60 would have been loaded with an earlier instruction such as LLCT. When this instruction is executed, the branch field and branch block is used to return to the top of the loop if the counter 60 is not equal to zero and the microprogram counter 52 will be updated with the branch address plus one. At the same time, the loop counter 60 is decremented. If the loop counter 60 equals zero when this instruction is executed, the next microinstruction performed will be from the "branch block" and the microprogram counter 52 will be incremented.

BRTP: Branch or return and pop. This instruction is used to return from subroutines. However, this instruction can also be used to provide a two-way branch in which there are no restrictions on the address branched to in either leg of the branch. The alternative branch is stored ahead of time on the stack with the push branch and continue (PBCT) instruction. If the condition passes, the stack is popped and is used along with the return block to branch to the address stored on the stack 56. The microprogram counter 52 is loaded with the address popped from the stack 56 plus one. If the condition fails, the next microinstruction performed will be from the "branch block" and the microprogram counter 52 will be updated with the branch address plus one.

LLCT: Load loop counter and continue. This instruction is independent of the condition code. The loop counter is loaded from the branch field. The next microinstruction performed will be from the "continue block" and the microprogram counter 52 will be incremented.

LLCB: Load loop counter and conditionally branch. This instruction loads the loop counter 60 from an external bus rather than the microcode branch field. Otherwise this instruction is exactly the same as the conditional branch (CBR) instruction. This instruction is typically used to set up a "branch until loop counter equals zero" operation with an external value. It may also be used to set up a vector which, via a subsequent LULB instruction, will be transferred to the microprogram counter resulting in a multi-way branch. The external value loaded in both of these applications typically is a value embedded in the assembly instruction or a data dependent value.

CLLC: Conditionally Load LPC and Continue. This instruction conditionally loads the LPC. If the condition passes, LPC is loaded from the branch field; otherwise the LPC is held. The next microinstruction performed will be from the "continue block" and the microprogram counter 52 will be incremented.

LLVB: Load loop counter with external vector bits and conditionally branch. This instruction is exactly the same as the LLCB instruction with the exception that the external data is masked off to the four (4) least significant bits.

LUBC: Load microprogram counter 52 from branch field and continue. This instruction is similar to the continue instruction in that the next microinstruction performed will be from the continue block 70 of microcode. It differs from the continue in that the microprogram counter 52 is not incremented but instead is loaded with the branch address. An instruction which uses the continue block 70 of microcode would normally follow the LUBC resulting in the execution of the microinstruction at the branch address loaded into the microprogram counter 52 by LUBC instruction. This instruction allows a microinstruction which is already in the continue block 70 of microcode to be effectively addressed via the branch address, thus preventing duplicate microinstructions in the continue and branch blocks 70 and 66.

LULB: Load microprogram counter 52 from the loop counter 60 and continue. This instruction is similar to the continue instruction in that the next microinstruction performed will be from the continue block 70. It differs from the continue in that the microprogram counter 52 is not incremented but instead is loaded with the contents of the loop counter 60. This instruction is typically used in combination with LLVB or LLCB for microcode vectoring. First the vector is loaded into the loop counter using LLVB or LLCB. Then the vector is transferred to the microprogram counter using LULB. An instruction which uses the continue block 70 of microcode would follow the LUBC resulting in the execution of the microinstruction at the address loaded into the microprogram counter 52 by the LUBC instruction.

LURC: Load microprogram counter 52 from the return block 68 (stack) address and continue. This instruction is similar to the continue instruction in that the next microinstruction performed will be from the continue block 79. It differs from the continue in that the microprogram counter 52 is not incremented but instead is loaded with the stack 56 address. An instruction which uses the continue block 70 of microcode would normally follow the LUBC resulting in the execution of the microinstruction at the stack 56 address loaded into the microprogram counter 52 by the LUBC instruction. This instruction allows a microinstruction which is already in the continue block 70 of microcode to be effectively accessed via the stack address, thus preventing duplicate microinstructions in the continue and return blocks 70 and 68.

BRTN: Branch or Return. Same as the BRTP but does not pop the stack. This is useful if the microinstruction at the address returned to is executed multiple times while a condition is true. When the condition is no longer true, the branch address is taken. The stack 56 can be maintained by a subsequent CBRP instruction.

It is understood that the above-described embodiment is merely illustrative of the possible specific embodiments which may represent principles of the present invention. Other arrangements may readily be devised in accordance with these principles by those skilled in the art without departing from the scope and spirit of the invention. For example, some implementations may not require a return block and associated return stack, and therefore two blocks of microcode may suffice. Other implementations may require additional blocks with unique address sources. Such additional blocks could be used to facilitate functions such as multi-way branching, start address vectoring and interrupt vectoring more efficiently than in the exemplary embodiment described herein, i.e., these functions could be performed in fewer clock cycles.

What is claimed is:

1. A microprogram controller for controlling a sequence of one microinstruction to a next microinstruction, comprising:
    a microprogram counter;
    continue accessing means for accessing a microinstruction for a next sequential address in microprogram store;
    branch accessing means for accessing a microinstruction from an address supplied by a current microinstruction;
    stack accessing means for accessing a microinstruction from an address supplied by a stack;
    selection means for executing each of respective accessing means in parallel to provide a selected accessed microinstruction, and wherein each of the selected accessed microinstructions comprises:
    (a) an instruction field,
    (b) a microinstruction field, and
    (c) a branch field;
    means responsive to a selection signal for selecting which one of said three accessed microinstructions is to be executed next in sequence; and
    control logic means responsive to:
    (1) said instruction field of a selected accessed microinstruction, and
    (2) an external status signal for generating a selection signal which is inputted to the selection means for selecting one of the three instructions, said control logic means comprising:
        means for causing a push branch and continue (PBCT) instruction to be executed, comprising:
        (i) means for pushing said branch field of said selected microinstruction on to said stack,
        (ii) means for selecting a microinstuction accessed by said continue accessing means as a next microinstruction to be executed next in sequence, and
        (iii) means for incrementing said microprogram counter.

2. The controller of claim 1 wherein said means for causing a PBCT instruction to be executed operates independently of said external status signal.

3. The controller of claim 1 wherein said control logic means further comprises means for causing a branch or return and pop (BRTP) instruction to be executed, comprising means for popping said stack, for returning to an address popped from said stack and for loading said microprogram counter with said address popped from said stack plus one if said external status signal is at a first predetermined state, and means for selecting said microinstruction accessed by said branch accessing means as a next microinstruction to be executed and for updating said microprogram counter with said branch field of said selected microinstruction plus one if said external status signal is at a second predetermined state.

4. The controller of claim 3 wherein said address popped from said stacks stored in said stack as a result of said PBCT instruction.

5. The controller of claim 1 wherein said control logic means further comprises means for causing a branch or return (BRTN) instruction to be executed, comprising means for selecting said microinstruction accessed by said stack accessing means and executing said selected microinstruction so long as said external status signal has a first predetermined state, and means for selecting said microinstruction accessed by said branch accessing means as a microinstruction to be executed next when said external status signal Do longer has said first predetermined state.

6. A microprogram controller for controlling a sequence of one microinstruction to a next microinstruction in an application specific integrated circuit, comprising:
    a microprogram counter;
    continue accessing means for accessing a microinstruction from a next sequential address in microprogram store;
    branch accessing means for accessing a microinstruction from an address supplied by a current microinstruction;
    stack accessing means for accessing a microinstruction from an address supplied by a stack;
    selection means for executing each of respective accessing means in parallel to provide a selected accessed microinstruction, and wherein each of the accessed microinstructions comprises:
    (a) an instruction field,
    (b) a microinstruction field,
    (c) a branch field;
    means responsive to a selection signal for selecting which one of said three accessed microinstructions is to be executed next in sequence; and
    control means responsive to:
    (1) said instruction field of a selected accessed microinstruction, and
    (2) an external status signal for generating a selection signal which is inputted to the selection means for selecting one of the three instructions, control logic means comprises:
        means for causing a "load microprogram counter from branch field and continue" (LUBC) instruction to be executed, comprising:
        (i) means for setting a selection signal to select said microinstruction accessed by said continue accessing means as a next microinstructions to be executed, and
        (ii) means for loading said microprogram counter with said branch field of said selected microinstruction.

7. A microprogram controller for controlling a sequence of one microinstruction to a next microinstruction in an application specific integrated circuit, comprising:
    a microprogram counter;
    continue accessing means for accessing a microinstruction from a next sequential address in microprogram store;
    branch accessing means for accessing microinstruction from an address supplied by a current microinstruction;
    stack accessing means for accessing a microinstruction from an address supplied by a stack;

selection means for executing each of respective accessing means in parallel to provide a selected accessed microinstruction, and wherein each of the accessed microinstructions comprises:
(a) an instruction field,
(b) a microinstruction field,
(c) a branch field;

means responsive to a selection signal for selecting which one of said three accessed microinstructions is to be executed next in sequence; and control logic means responsive to:
(1) said instruction field of a selected accessed microinstruction, and
(2) an external status signal for generating a selection signal which is inputted to the selection means for selecting one of the three instructions, wherein said control logic means comprises:
means for causing a "load microprogram counter from stack and continue" (LURC) instruction to be executed, comprising:
(i) means for setting a selection signal to select said microinstruction accessed by said continue accessing means as a next microinstruction to be executed, and
(ii) means for loading said microprogram counter with an address provided by said stack.

8. A microprogram controller for controlling a sequence of one microinstruction to a next microinstruction in an application specific integrated circuit, comprising:

a microprogram counter;
a loop counter;
continue accessing means for accessing a microinstruction from an address supplied by a current microinstruction;
branch accessing means for accessing a microinstruction from an address supplied by a current microinstruction;
stack accessing means for accessing a microinstruction from an address supplied by a stack;
selection means for executing each of respective accessing means in parallel to provide selected accessed microinstruction, and wherein each of the accessed microinstructions comprises:
(a) an instruction field,
(b) a microinstruction field, and
(c) a branch field;

means responsive to a selection signal for selecting which one of said three accessed microinstructions is to be executed next in sequence; and control logic means responsive to:
(1) said instruction field of a selected accessed microinstruction, and
(2) an external status signal for generating a selection signal which is inputted to the selection means for selecting one of the three instructions, wherein said control logic means comprises:
(a) means for causing a "load microprogram counter from loop counter and continue" (LULB) instruction to be executed, comprising:
(i) means for setting a selection signal to select said microinstruction accessed by said continue accessing means as a next microinstruction to be executed, and
(ii) means for loading said microprogram counter with contents of said loop counter.

* * * * *